United States Patent
Chi et al.

(10) Patent No.: US 9,626,057 B2
(45) Date of Patent: Apr. 18, 2017

(54) TOUCH PANEL WITH FLEXIBLE TOUCH SENSOR AND METHOD FOR MANUFACTURING THE SAME

(71) Applicant: TPK Touch Solutions (Xiamen) Inc., Xiamen (CN)

(72) Inventors: Ho-Hsun Chi, Hsinchu (TW); Yau-Chen Jiang, Hsinchu (TW); Bin Lai, Fuzhou (CN); Yanjun Xie, Wuhan (CN)

(73) Assignee: TPK Touch Solutions (XIAMEN) Inc., Xiamen (CN)

( * ) Notice: Subject to any disclaimer, the term of this patent is extended or adjusted under 35 U.S.C. 154(b) by 8 days.

(21) Appl. No.: 14/825,152

(22) Filed: Aug. 12, 2015

(65) Prior Publication Data
US 2016/0048229 A1 Feb. 18, 2016

(30) Foreign Application Priority Data
Aug. 16, 2014 (CN) ...................... 2014 2 0471745 U

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 2203/04102* (2013.01); *G06F 2203/04103* (2013.01)

(58) Field of Classification Search
CPC ....................................................... G06F 3/044
See application file for complete search history.

(56) References Cited

U.S. PATENT DOCUMENTS

| | | | | |
|---|---|---|---|---|
| 8,564,314 B2* | 10/2013 | Shaikh | ................. | G06K 9/0002 324/658 |
| 8,988,371 B2* | 3/2015 | Ho | ......................... | G06F 3/044 345/156 |
| 9,128,560 B2* | 9/2015 | Ng | ........................ | G06F 3/0416 |
| 9,411,473 B2* | 8/2016 | Huang | ..................... | G06F 3/044 |
| 2003/0052867 A1* | 3/2003 | Shigetaka | ............... | G06F 3/044 345/173 |
| 2009/0085885 A1* | 4/2009 | Wu | ........................ | G06F 3/041 345/173 |
| 2010/0265193 A1* | 10/2010 | Kung | ...................... | G06F 3/044 345/173 |
| 2011/0012845 A1* | 1/2011 | Rothkopf | ................ | G06F 3/044 345/173 |
| 2011/0254802 A1* | 10/2011 | Philipp | .................. | G06F 3/0412 345/174 |
| 2011/0261003 A1* | 10/2011 | Lee | ..................... | G02F 1/13338 345/174 |
| 2011/0267308 A1* | 11/2011 | Park | ........................ | G06F 3/044 345/174 |

(Continued)

*Primary Examiner* — Patrick F Marinelli
(74) *Attorney, Agent, or Firm* — Cooper Legal Group, LLC

(57) ABSTRACT

A touch panel comprises a flexible touch sensor and a cover plate. The cover plate and the flexible touch sensor are attached to each other by an adhesive layer. The flexible touch sensor at least comprises a sensing electrode structure disposed on a flexible substrate. The sensing electrode structure comprises a first insulating layer and a first patterned conductive layer formed on the first insulating layer. The first insulating layer is disposed between the flexible substrate and the first patterned conductive layer and directly contacts the flexible substrate.

10 Claims, 15 Drawing Sheets

(56) References Cited

U.S. PATENT DOCUMENTS

| | | | | |
|---|---|---|---|---|
| 2011/0279398 A1* | 11/2011 | Philipp | ............... | G06F 3/044 345/174 |
| 2011/0279402 A1* | 11/2011 | Yoo | ............... | G06F 3/044 345/174 |
| 2011/0279405 A1* | 11/2011 | Meng | ............... | G06F 3/044 345/174 |
| 2011/0298750 A1* | 12/2011 | Wang | ............... | G06F 3/0412 345/174 |
| 2012/0013546 A1* | 1/2012 | Westhues | ............... | G06F 3/044 345/173 |
| 2012/0105081 A1* | 5/2012 | Shaikh | ............... | G06K 9/0002 324/686 |
| 2013/0043068 A1* | 2/2013 | Xie | ............... | G06F 3/044 174/262 |
| 2013/0093696 A1* | 4/2013 | Huang | ............... | G06F 3/044 345/173 |
| 2013/0106726 A1* | 5/2013 | Ho | ............... | G06F 3/044 345/173 |
| 2013/0154979 A1* | 6/2013 | Li | ............... | G06F 3/041 345/173 |
| 2013/0168220 A1* | 7/2013 | Ho | ............... | G06F 3/044 200/600 |
| 2013/0222314 A1* | 8/2013 | Wang | ............... | G06F 3/041 345/173 |
| 2013/0271408 A1* | 10/2013 | Xie | ............... | G06F 3/044 345/173 |
| 2014/0104514 A1* | 4/2014 | Wang | ............... | G06F 3/0412 349/12 |
| 2014/0191978 A1* | 7/2014 | Ng | ............... | G06F 3/044 345/173 |
| 2014/0315003 A1* | 10/2014 | Dougase | ............... | B41M 1/10 428/207 |
| 2015/0109238 A1* | 4/2015 | Chen | ............... | G06F 3/046 345/174 |
| 2015/0220183 A1* | 8/2015 | Youngs | ............... | G06F 3/044 345/173 |
| 2015/0346880 A1* | 12/2015 | Xiao | ............... | G06F 3/047 345/173 |
| 2015/0373839 A1* | 12/2015 | Kim | ............... | H05K 1/0274 345/174 |
| 2016/0048229 A1* | 2/2016 | Chi | ............... | G06F 3/041 345/173 |

* cited by examiner

TOUCH PANEL WITH FLEXIBLE TOUCH SENSOR AND METHOD FOR MANUFACTURING THE SAME

BACKGROUND OF THE INVENTION

This Non-provisional application claims priority under 35 U.S.C. §119(a) on Patent Application No 201420471745.1 filed in People's Republic of China on Aug. 16, 2014, the entire contents of which are hereby incorporated by reference.

Technical Field

The disclosure relates to touch panels and in particular, to a touch panel with a flexible touch sensor.

Related Art of the Invention

With the development of technologies, the touch panel has been applied to various electronic products, such as cell phones, notebook computers, tablet computers, digital cameras, electronic albums, and users can make the input operation by the touch panel.

The structure of a conventional touch panel includes a cover plate and a touch sensing layer. The touch sensing layer is directly formed on the cover plate, or formed on a hard substrate in advance and then attached to the cover plate through an adhesive layer. In other words, the touch sensing layer of the conventional touch panel is formed on the carrier (cover plate or substrate) having a certain degree of hardness and a level surface. Therefore, the touch panel will have some limitations in application. Accordingly, the conventional touch panel struggles to meet the developing requirements of products.

SUMMARY OF THE DISCLOSURE

To alleviate the above technical problem, a flexible touch sensor of this disclosure comprises a sensing electrode structure disposed on a flexible substrate. The sensing electrode structure comprises a first insulating layer and a first patterned conductive layer formed on the first insulating layer. The first insulating layer is disposed between the flexible substrate and the first patterned conductive layer and directly contacts the flexible substrate.

In one or more embodiments, the sensing electrode structure further includes a first wire layer, which is disposed on the first insulating layer, electrically connected with the first patterned conductive layer and disposed on the same surface of the first insulating layer as the first patterned conductive layer.

In some embodiments, the sensing electrode structure further includes a second insulating layer disposed on the first patterned conductive layer and a second patterned conductive layer formed on the second insulating layer.

In some embodiments, the second insulating layer covers the first patterned conductive layer and the first wire layer.

In some embodiments, the second insulating layer covers a part of the first patterned conductive layer and avoids the joint of the first patterned conductive layer and first wire layer.

In some embodiments, the second insulating layer covers the first patterned conductive layer, and the first wire layer is disposed on the second insulating layer and electrically connected with the first patterned conductive layer by a through hole and a conductive medium filled therein.

In some embodiments, the sensing electrode structure further includes a second wire layer electrically connected with the second patterned conductive layer, and the second wire layer is disposed on the second insulating layer and on the same surface of the second insulating layer as the second patterned conductive layer.

In some embodiments, the sensing electrode structure further includes a protection layer disposed on the first patterned conductive layer.

In some embodiments, the material of the flexible substrate includes PI, PP, PS, ABS, PET, PVC, PC, PE, PMMA, PTFE, COP, Arton or their any combination.

In some embodiments, the thickness of the flexible substrate is between 0.1 μm and 15 μm.

In some embodiments, the thickness of the flexible substrate is between 2 μm and 5 μm.

In some embodiments, the first insulating layer has hot pressing adhesion property.

In some embodiments, the first patterned conductive layer is formed by the conductive plasma containing conductive polymer material or nano metal material.

In some embodiments, the first patterned conductive layer is formed by nano silver plasma.

In some embodiments, the second insulating layer has hot pressing adhesion property.

In some embodiments, the second patterned conductive layer is formed by the conductive plasma containing conductive polymer material or nano metal material.

In some embodiments, the second patterned conductive layer is formed by nano silver plasma.

Furthermore, a touch panel including the above flexible touch sensor is provided in this disclosure, comprising any of the above-mentioned flexible touch sensors and a cover plate. The cover plate and the flexible touch sensor are attached to each other by an adhesive layer.

In some embodiments, the adhesive layer is disposed between the cover plate and the substrate of the flexible touch sensor.

In some embodiments, the surface of the cover plate attached to the flexible touch sensor is a level surface.

In some embodiments, the surface of the cover plate attached to the flexible touch sensor is a curved surface.

In some embodiments, the cover plate is a reinforced glass plate.

In some embodiments, the cover plate is a sapphire glass plate.

In some embodiments, a blocking layer is formed on the cover plate, and the normal projection of the blocking layer on the cover plate at least covers the normal projection of the first wire layer and second wire layer of the flexible touch sensor on the cover plate.

A manufacturing method of the above touch panel is further provided in this disclosure, including the following steps: A1: forming a flexible substrate on a first carrying plate; A2: forming a sensing electrode structure on the flexible substrate; A3: forming a second carrying plate on the sensing electrode structure; A4: removing the first carrying plate from the flexible substrate; A5: attaching a cover plate to the flexible substrate which is disposed between the cover plate and the sensing electrode structure; and A6: removing the second carrying plate from the sensing electrode structure.

In some embodiments, in the step A1, the flexible substrate is attached to the first carrying plate by a first adhesive layer.

In some embodiments, in the step A3, the second carrying plate is attached to the sensing electrode structure by a second adhesive layer.

In some embodiments, in the step A4, the first carrying plate is removed from the flexible substrate by being soaked in a solution, a thermal treatment, a cold treatment, being forced to peel off or their any combination.

In some embodiments, the first adhesive layer is disposed around the first carrying plate, the sensing electrode structure is disposed in the inner region of the first adhesive layer, and the step A5 includes: cutting off the first adhesive layer along the inner side of the first adhesive layer and then removing the first carrying plate from the flexible substrate.

In some embodiments, the first adhesive layer with the portion of the first carrying plate under the first adhesive layer is cut off along the inner side of the first adhesive layer.

In some embodiments, the first adhesive layer is disposed around the first carrying plate, the sensing electrode structure is disposed in the inner region of the first adhesive layer, and the manufacturing method further includes: cutting off the first adhesive layer along the inner side of the first adhesive layer, which is between the step A1 and the step A2.

In some embodiments, the step A6 includes: giving the illumination, thermal treatment, cold treatment or their any combination to the second adhesive layer and then removing the second adhesive layer and the second carrying plate from the sensing electrode structure.

In some embodiments, the step of forming the sensing electrode structure includes: forming a first insulating layer on the flexible substrate, wherein a conductive material used to form a first patterned conductive layer is disposed on the first insulating layer; locally curing the conductive material; curing the first insulating layer; forming the first patterned conductive layer; forming a first wire layer on the first insulating layer, wherein the first wire layer is electrically connected with the first patterned conductive layer; and forming a protection layer on the first patterned conductive layer.

In some embodiments, the step of forming the first insulating layer on the flexible substrate further includes a step of removing a first release layer which is disposed on the first insulating layer.

In some embodiments, in the step of forming the first insulating layer on the flexible substrate, the first insulating layer is attached to the flexible substrate by hot pressing.

In some embodiments, the manufacturing method further includes a step of removing a second release layer disposed on the conductive material, which is after the step of locally curing the conductive material and before the step of curing the first insulating layer.

In some embodiments, the manufacturing method further includes a step of forming a blocking layer on the cover plate and the blocking layer is disposed on at least one side of the cover plate.

As mentioned above, in this disclosure, the sensing electrode structure is disposed on a flexible substrate and the composition and material of the sensing electrode structure are improved. Thereby, the touch sensor is provided with a certain degree of flexibility and thus suitable for the product designs of flat and curved attachment surfaces. Besides, the whole structure of the touch sensor is lightened and thinned.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

Figure 1:
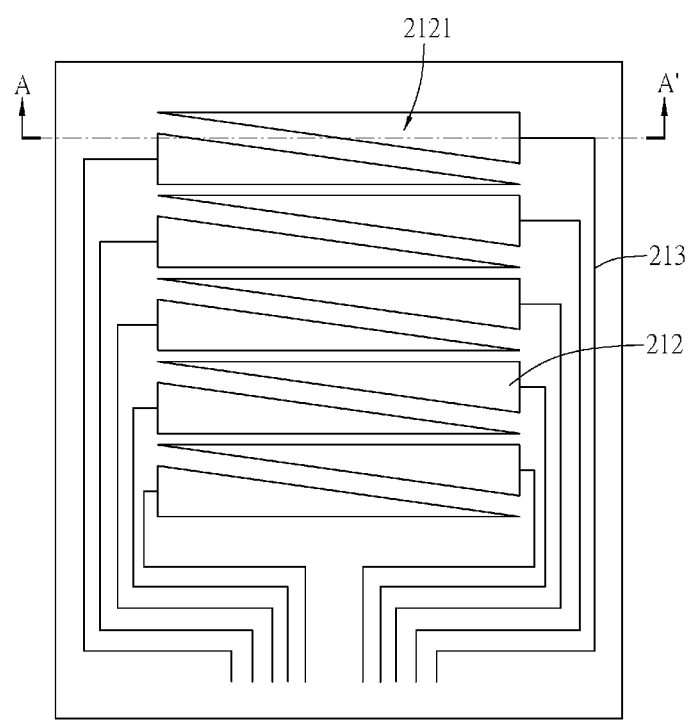
FIG. 1 is a schematic top view of a flexible touch sensor of one or more embodiments of the disclosure.

The present disclosure will be apparent from the following detailed description, which proceeds with reference to the accompanying drawings, wherein the same references relate to the same elements.

To be noted, the accompanying drawings are all the schematic diagrams for illustrating the essential structure of the disclosure. Therefore, only the elements related to this disclosure are marked in the drawings and the shown elements are not drawn according to the actual quantity, shape or dimensions. To be noted, the actual standard or dimensions is a selective design where the element arrangement may be more complicated. Besides, the position relation between the elements, such as "up", "down", "left", "right" or the like, is just for illustration according to the drawings but not for being limitative of this disclosure.

Figure 2:
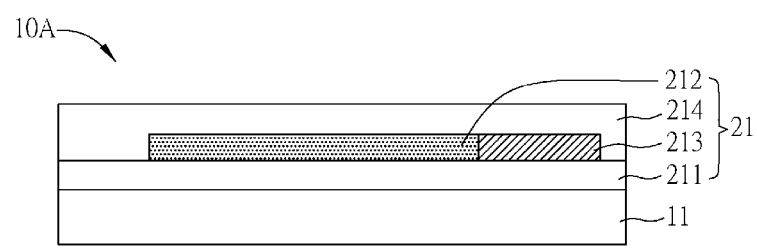
FIG. 2 is a schematic sectional diagram taken along the line A-A' in FIG. 1.

FIG. 1 is a schematic top view of a flexible touch sensor of one or more embodiments of the disclosure, and FIG. 2 is a schematic sectional diagram taken along the line A-A' in FIG. 1. As shown in FIGS. 1 and 2, the flexible touch sensor 10A includes a flexible substrate 11 and a sensing electrode structure 21. The sensing electrode structure 21 is disposed on the flexible substrate 11 and includes a first insulating layer 211 and a first patterned conductive layer 212. The first patterned conductive layer 212 is formed on the first insulating layer 211, and the first insulating layer 211 is disposed between the flexible substrate 11 and the first patterned conductive layer 212 and directly contacts the flexible substrate 11.

Furthermore, the sensing electrode structure 21 of some embodiments further includes a first wire layer 213, which is disposed on the first insulating layer 211, electrically connected with the first patterned conductive layer 212 and disposed on the same side as the first patterned conductive layer 212. In particular, the first wire layer 213 and the first patterned conductive layer 212 are disposed on the same surface of the first insulating layer 211. The first patterned conductive layer 212 of some embodiments includes a plurality of first sensing elements 2121 which are electrically insulated from each other. The first wire layer 213 is electrically connected with the first sensing elements 2121 so as to transmit the touch signal generated by the first sensing elements 2121 to an outside controller.

In an embodiment, the sensing electrode structure 21 further includes a protection layer 214. The protection layer 214 is disposed on the first patterned conductive layer 212 and covers the first patterned conductive layer 212 so as to prevent the first patterned conductive layer 212 from being oxidized by air or scratched during the subsequent process. In some embodiments, the protection layer 214 is further extended to cover the first wire layer 213 so as to also provide the protection for the first wire layer 213.

In some embodiments, the flexible substrate 11 is a single-layer or multi-layer structure, or is composed of an lower layer with the capability of release and an upper layer without the capability of release. The material of the flexible substrate 11 can include PI, PP, PS, ABS, PET, PVC, PC, PE, PMMA, PTFE, COP, Arton or their any combination. The flexible substrate 11 is formed by coating or other proper methods, and the thickness thereof is about between 0.1 μm and 15 μm or favorably between 2 μm and 5 μm, but this disclosure is not limited thereto. The flexible substrate 11 has a less thickness than a normal glass substrate and has a good flexibility. Besides, the flexible substrate 11 with such thickness range has a good optical characteristic such as high transmittance.

In some embodiments, the sensing electrode structure 21 is a single-layer electrode structure formed by a single-layer conductive material, but it also may be a double-layer electrode structure or multi-layer electrode structure in other embodiments. The structural feature thereof is: disposing the conductive material that is used to form the first patterned conductive layer 212 on the first insulating layer 211; and patterning the conductive material to form the first patterned conductive layer 212 after attaching the first insulating layer 211 to the flexible substrate 11. Accordingly, the first insulating layer 211 and the flexible substrate 11 directly contact each other while no other layer structure exists therebetween, and also the first patterned conductive layer 212 and the first insulating layer 211 directly contact each other while no other layer structure exists therebetween.

The first insulating layer 211 of the sensing electrode structure 21 includes silicone or acrylic silicone as material and is mixed with photosensitive material. The first insulating layer 211 has transparency, electrical insulation, hot pressing adhesion and oxygen inhibition photocuring properties. The first insulating layer 211 can receive the hot pressing treatment to be directly attached to the upper surface of the flexible substrate 11 by its own hot pressing adhesion property, and can also serve as the carrying substrate of the first patterned conductive layer 212 for the processing. Accordingly, the first insulating layer 211 of some embodiments can serve as the carrying substrate of the first patterned conductive layer 212 for the processing and also as the attachment material to the flexible substrate 11, so that the structure of the flexible touch sensor 10A is simplified, lightened and thinned.

The first patterned conductive layer 212 of the sensing electrode structure 21 is formed by the liquid conductive material containing conductive polymer material or nano metal material. For example, the conductive polymer material is PEDOT:PSS and the nano metal material is nano silver or nano copper. In some embodiments, the favorable material for forming the first patterned conductive layer 212 is nano silver plasma, which has good conductivity, extensibility and high transmittance, but this disclosure is not limited thereto. The conductive material for forming the first patterned conductive layer 212 is the liquid conductive plasma having an oxygen inhibition photocuring property. Accordingly, the conductive material is patterned without the coating and etching processes of the photoresistive material, and therefore the whole manufacturing process is simplified. The related manufacturing technique will be illustrated as below.

The first wire layer 213 of the sensing electrode structure 21 is a single-layer structure, for example, formed by one of the copper, aluminum and nano silver plasma or other conductive materials. The first wire layer 213 also is a double-layer or multi-layer structure, for example, formed by molybdenum, aluminum and nano silver plasma. The first wire layer 213 is formed into a Mo—Al—Mo multi-layer structure for example.

The protection layer 214 of the sensing electrode structure 21 is formed by the transparent insulating material such as Nb2O5. SiO2 or transparent photoresistive material. The protection layer 214 is formed into a single-layer structure by a single material or into a multi-layer structure by multiple materials. For example, the multi-layer stack formed by Nb2O5 and SiO2 can provide the protection effect and optical adjusting function. The above optical adjusting function indicates the etched zone and non-etched zone of the conductive material cannot be differentiated by human eyes due to the refractive-index matching, and therefore the appearance effect of the product is enhanced.

The above is the illustration about the structure and material property of the elements according to some embodiments. The manufacturing method of the flexible touch sensor of the above will be illustrated as below.

Figure 3:
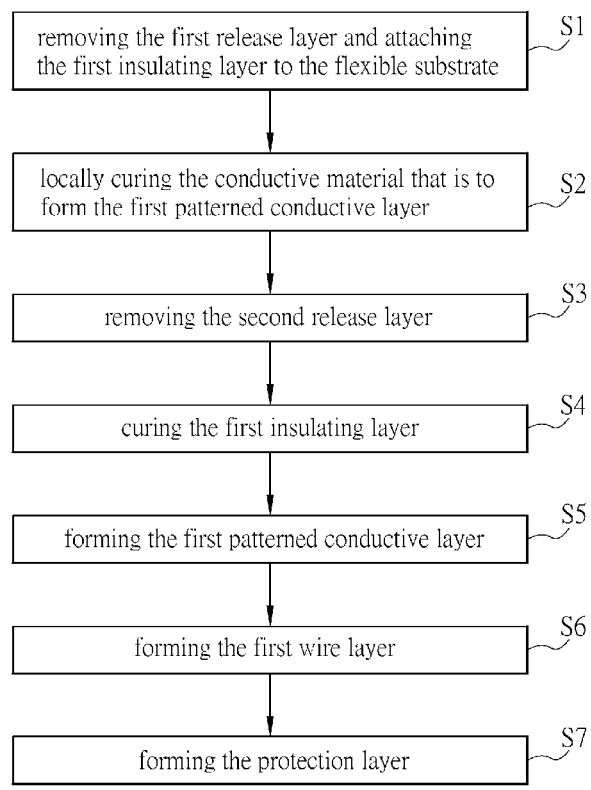
FIG. 3 is a flowchart of the manufacturing method of the flexible touch sensor of FIG. 1 of the disclosure.
Figure 4:
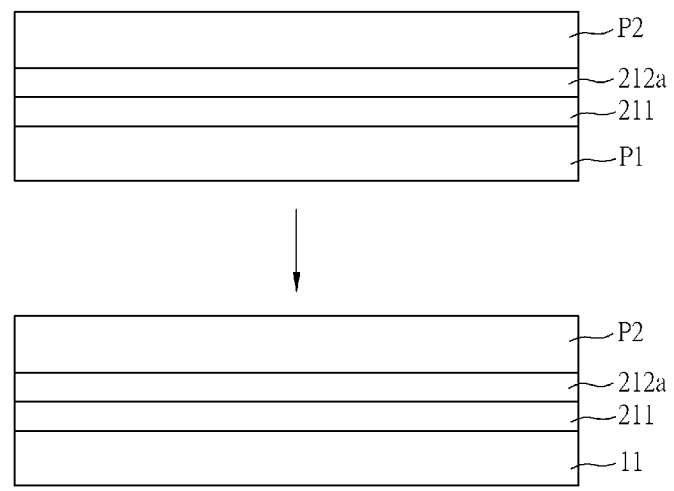
FIGS. 4 to 10 are schematic diagrams showing the structure in each step.

Refer to FIGS. 3 to 10, wherein FIG. 3 is a flowchart of the manufacturing method of the flexible touch sensor of FIG. 2 of the disclosure and FIGS. 4 to 10 are schematic diagrams showing the structure in each step.

The flowchart of the manufacturing method of the flexible touch sensor of HG. 2 includes the following steps.

The step S1 is: removing the first release layer P1 disposed on the lower surface of the first insulating layer 211 and also attaching the first insulating layer 211 to the flexible substrate 11 by hot pressing. In some embodiments, to be noted, the first insulating layer 211 and the first patterned conductive layer 212 during the process are different from the final formation. That is, a first release layer P1 is detachably disposed on the lower surface of the first insulating layer 211, and a second release layer P2 is detachably disposed on the upper surface of the first patterned conductive layer 212. In the formation of the first patterned conductive layer 212, the liquid conductive material 212a containing conductive polymer material or nano metal is formed on the upper surface of the first insulating layer 211 by coating or printing and then a curing treatment is given thereto. Therefore, in this step, the first patterned conductive layer 212 is still the complete or continuous film or layer (i.e. at the state of the whole-layer conductive material 212a) without undergoing the patterning treatment.

In this step, the pressure of the hot pressing treatment is 3.5 MPa and the process environment temperature is 110° C., and therefore the first insulating layer 211 formed by the silicone or acrylic silicone is provided with the adhesive property after being melted and is attached to the flexible substrate 11 (cooled at a certain temperature for example). However, in some embodiments, the temperature of the hot pressing treatment is set as between 100° C. and 140° C. and the pressure of the hot pressing treatment is set as between 2.5 MPa and 5.0 MPa, and such process conditions can effectively facilitate the attachment process of the step S1 and keep good process yield.

Figure 5:
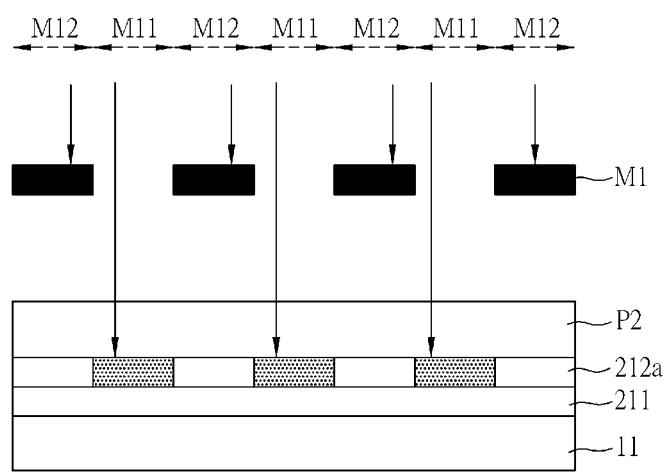

As shown in FIG. 5, the step S2 is: implementing a local exposure to the conductive material 212a that is to form the first patterned conductive layer 212 according to a predetermined pattern so as to form the corresponding patterned region of the conductive material 212a into a curing pattern.

Physically, this step is to determine the curing pattern of the conductive material 212a by the first mask M1, which includes a plurality of transparent regions M11 and a plurality of opaque regions M12 (marked by dots). Since the first insulating layer 211 and the conductive material 212a of some embodiments both have oxygen inhibition photocuring property, they will be cured when receiving the UV illumination under the environment without oxygen. In some embodiments, since the two surfaces of the first insulating layer 211 are covered by the conductive material 212a and the flexible substrate 11 and the two surfaces of the conductive material 212a are covered by the first insulating layer 211 and the second release layer P2, the most parts of the first insulating layer 211 and conductive material 212a won't directly contact the oxygen in the air. Accordingly, when the first insulating layer 211 and the conductive material 212a are illuminated by the ultraviolet light (such as 365 nm UV) through the transparent regions M11 of the first mask M1, the portions of the first insulating layer 211 and conductive material 212a corresponding to the transparent regions M11 will be cured while other portions corresponding to the opaque regions M12 will stay at the uncured state. Therefore, after the conductive material 212a receives the local exposure treatment, the corresponding patterned regions thereof will be formed into the curing pattern and the pattern of the first patterned conductive layer 212 is thus determined.

Figure 6:
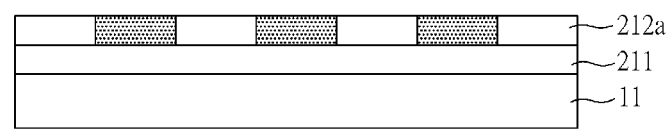
Figure 7:
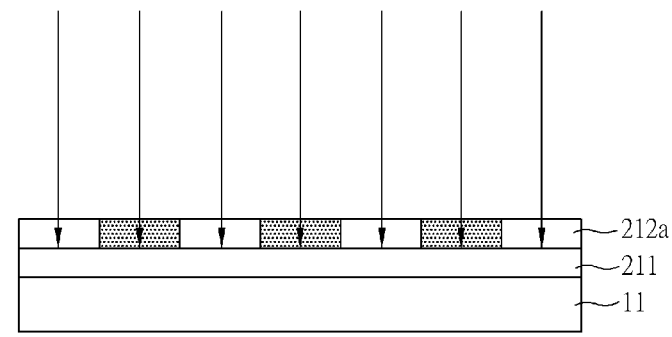

As shown in FIGS. 6 and 7, the steps S3, S4 are to implement the exposure and curing treatment to the whole first insulating layer 211.

The step S3 is: removing the second release layer P2 from the conductive material 212a so as to expose the conductive material 212a to the air to so that the conductive material 212a can contact the oxygen.

Then, the step S4 is; implementing the whole-surface exposure treatment to the conductive material 212a and the first insulating layer 211, wherein the first insulating layer 211 is illuminated and cured when its upper and lower surfaces are both covered and insulated from the oxygen. In this step, although the conductive material 212a also receives the whole-surface exposure, it will not generate the whole curing reaction and will stay at the local curing state like in the step S2 because of its oxygen inhibition photocuring property, when it undergoes the whole-surface UV illumination under the environment with oxygen. Therefore, after the step S4, the whole curing treatment of the first insulating layer 211 is completed while the conductive material 212a stays at the local curing state in the step S3.

Figure 8:
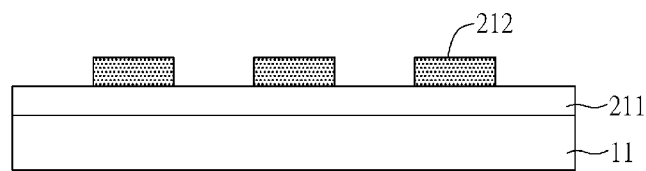

As shown in FIG. 8, the step S5 is to complete the patterning process of the conductive material 212a. In this step, the uncured portion of the conductive material 212a is removed by the chemical agent such as a developer, so that the conductive material 212a is formed into the first patterned conductive layer 212 by the development treatment. Because the first, insulating layer 211 has received the whole-surface exposure and curing treatment in the step S4, it will not be removed by the developer in this step.

Figure 9:
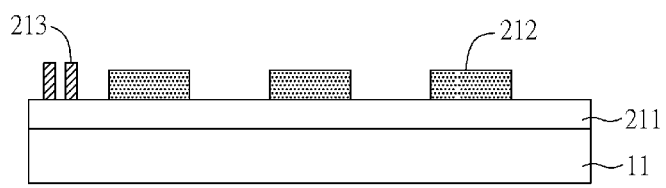

As shown in FIG. 9, the step S6 is to form the first wire layer 213 on the first insulating layer 211, wherein the first wire layer 213 is electrically connected with the first patterned conductive layer 212. In this step, the first wire layer 213 is formed by screen-printing the conductive material (the conductive material for forming the first wire layer 213) or by coating or printing the whole-surface conductive material plus a patterning treatment, for example. It is comprehended that if the first wire layer 213 and the first patterned conductive layer 212 are formed by the same material, the first wire layer 213 is formed when the first patterned conductive layer 2212 is patterned. In other words, the first wire layer 213 and the first patterned conductive layer 212 are formed in the same step.

Figure 10:
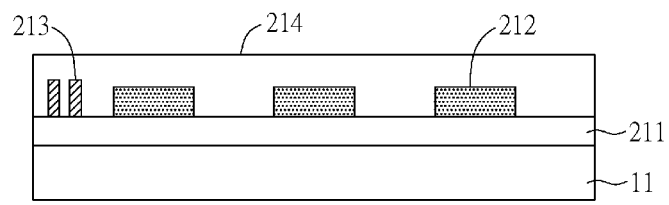

As shown in FIG. 10, the step S7 is to form the protection layer 214 on the first patterned conductive layer 213, wherein the protection layer 214 at least covers the first patterned conductive layer 213. The protection layer 214 is formed by printing or coating.

Throughout the above steps S1~S7 some embodiments uses the oxygen inhibition photocuring properties of the first insulating layer 211 and the conductive material 212a for forming the first patterned conductive layer 212 to easily complete the patterning process of the first patterned conductive layer 212 by the exposure and development without implementing additional etching to the conductive material 212a. Therefore, the manufacturing steps are simplified and the process yield is enhanced. However, according to different requirements, the patterning process of the conductive material 212a may be also implemented in another manner.

Furthermore, this disclosure uses the extensible material to form the elements of the sensing electrode structure 21 so as to obtain the sensing electrode structure 21 which has extensibility, and also directly attaches the sensing electrode structure 21 to the flexible substrate 11 without disposing any adhesive material therebetween to obtain the flexible touch sensor 10A having a simplified structure with lightness and thinness. Accordingly, the flexible touch sensor 10A is applied not only to a conventional flat cover plate but also to a curved carrying plate which has a curved attachment surface, so as to meet the diverse product requirements.

Figure 11:
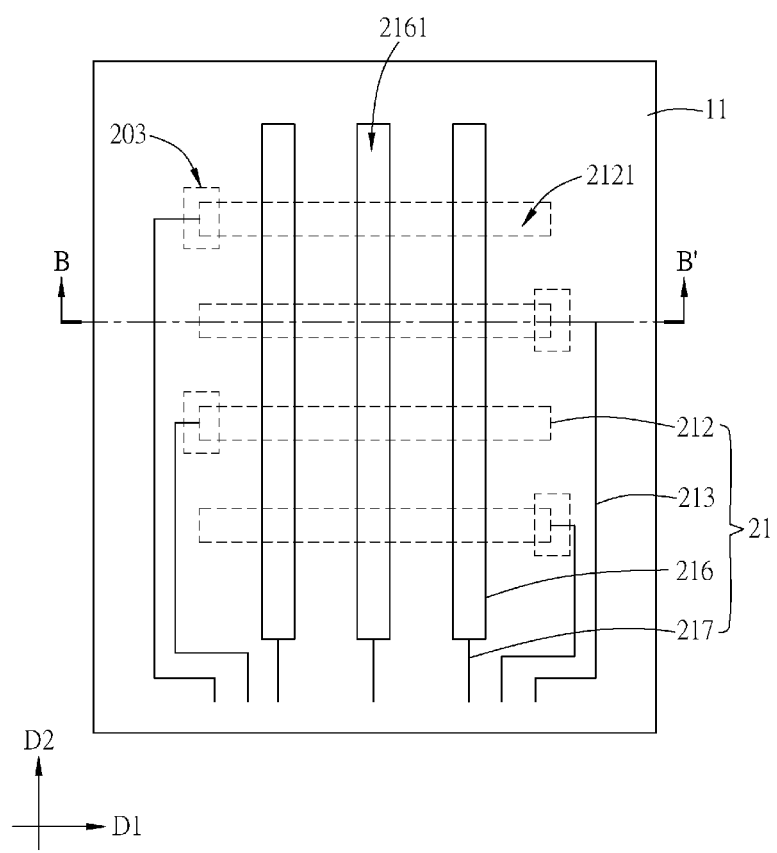
FIG. 11 is a schematic top view of the double-layer electrode structure of the flexible touch sensor.
Figure 13:
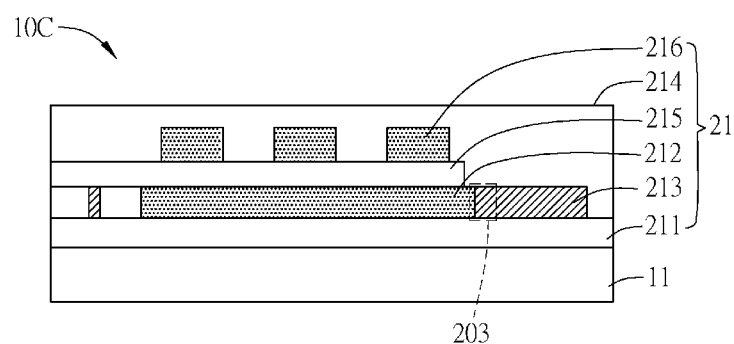
Figure 14:
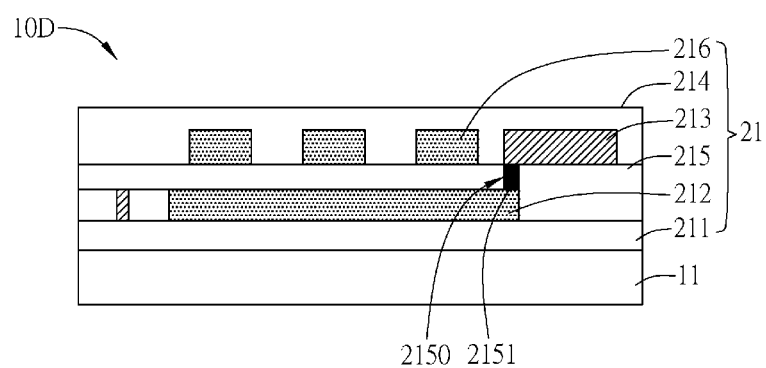

In FIG. 1 and FIG. 2 of the disclosure, the sensing electrode structure is a single-layer electrode structure. In other embodiments, the sensing electrode structure may be a double-layer electrode structure, which will be illustrated by FIGS. 11 to 14. FIG. 11 is a schematic top view of the double-layer electrode structure of the flexible touch sensor, and FIGS. 12 to 14 are schematic sectional diagrams taken along the line B-B' in FIG. 11.

Figure 12:
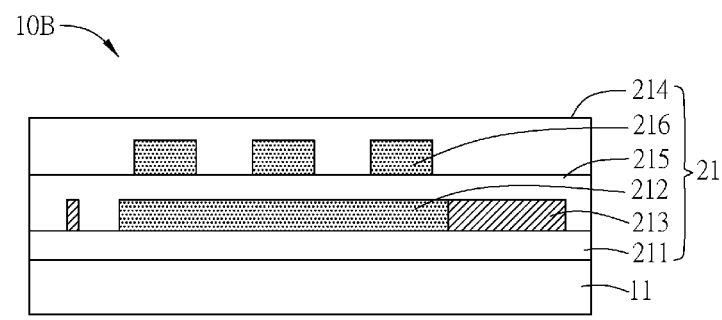
FIGS. 12 to 14 are schematic sectional diagrams taken along the line B-B' in FIG. 11.

Refer to FIGS. 11 and 12, wherein FIG. 12 is a schematic sectional diagram of the flexible touch sensor of some embodiments of the disclosure. The main difference between the flexible touch sensor 10B and the flexible touch sensor 10A of FIG. 2 is that the sensing electrode structure 21 of the flexible touch sensor 10B further includes a second insulating layer 215, a second patterned conductive layer 216 and a second wire layer 217. The composition and connecting relation of other elements of some embodiments are approximately the same as FIG. 1 and FIG. 2, so the related illustration is omitted here for conciseness. To be noted, the second insulating layer 215, the second patterned conductive layer 216 and the second wire layer 217 of some embodiments have the same material, corresponding structure variation and forming method as the first insulating layer 211, the first patterned conductive layer 212 and the first wire layer 213 of FIG. 1 and FIG. 2, respectively.

Physically, the sensing electrode structure 21 includes the first insulating layer 211 disposed on the upper surface of the flexible substrate 11, the first patterned conductive layer 212 formed on the first insulating layer 211, the first wire layer 213 formed on the first insulating layer 211 and electrically connected with the first patterned conductive layer 212, the second insulating layer 215 disposed on the first patterned conductive layer 212, the second patterned conductive layer 216 formed on the second insulating layer 215, the second wire layer 217 formed on the second insulating layer 215 and electrically connected with the second patterned conductive layer 216, and the protection layer 214 disposed on the second patterned conductive layer 216 and at least covering the second patterned conductive layer 216. In some embodiments, the second insulating layer 215 is also directly attached to the first patterned conductive layer 212 by hot pressing and formed to cover the first patterned conductive layer 212 and the first wire layer 213. In other words, the second insulating layer 215 is directly attached to the first patterned conductive layer 212 due to its own hot pressing adhesion property without drawing support from other adhesive mediums. The second insulating layer 215 covers both of the first patterned conductive layer 212 and the first wire layer 213 so as to prevent them from being oxidized by air and provide the protection effect for them.

To be noted, in some embodiments, the first patterned conductive layer 212 includes a plurality of first sensing elements 2121 which are extended along the first direction D1 and separated from each other along the second direction D2, and the second patterned conductive layer 216 includes a plurality of second sensing elements 2161 which are extended along the second direction D2 and separated from each other along the first direction D1. The first direction D1 and the second direction D2 are perpendicular to each other in some embodiments, but they may have an included angle instead of a square angle in other embodiments.

Refer to FIGS. 11 and 13, wherein FIG. 13 is a schematic sectional diagram of the flexible touch sensor of some embodiments of the disclosure. The main difference between the flexible touch sensor 10C of some embodiments and the flexible touch sensor 10B of FIG. 12 is that the second insulating layer 215 is disposed on and covers the first patterned conductive layer 212 but avoids the joint 203 of the first patterned conductive layer 212 and first wire layer 213. Accordingly, the first wire layer 213 and the second wire layer 217 is formed in the same manufacturing step so as to save the manufacturing process. The composition and connecting relation of other elements of some embodiments are approximately the same as FIG. 12, so the related illustration is omitted here for conciseness.

Refer to FIGS. 11 and 14, wherein FIG. 14 is a schematic sectional diagram of the flexible touch sensor of some embodiments of the disclosure. The main difference between the flexible touch sensor 10D and the flexible touch sensor 10B of FIG. 12 is that the first wire layer 213 is formed on the second insulating layer 215, and the electrical connection manner between the first wire layer 213 and the first patterned conductive layer 212 is illustrated as below. The second insulating layer 215 is configured with a through hole 2150 which is disposed corresponding to the joint 203 of the first wire layer 213 and first patterned conductive layer 212, and a conductive medium 2151 is filled into the through hole 2150 to connect the first wire layer 213 with the first patterned conductive layer 212. Accordingly, the first wire layer 213 and the second wire layer 217 are formed in the same manufacturing step so as to save the manufacturing process. The composition and connecting relation of other elements of some embodiments are approximately the same as FIG. 12, so the related illustration is omitted here for conciseness.

For the flexible touch sensors 10B, 10C, 10D of FIG. 12, FIG. 13, FIG. 14, in comparison with FIG. 2, the sensing electrode structure further includes the second insulating layer, the second patterned conductive layer and the second wire layer and the position relation of the related elements (such as the protection layer and the first wire layer) is adjusted, so the forming sequence of the elements is different from FIG. 2. The manufacturing method of the flexible touch sensor 10B of FIG. 12 will be illustrated for instance as below.

Figure 15:
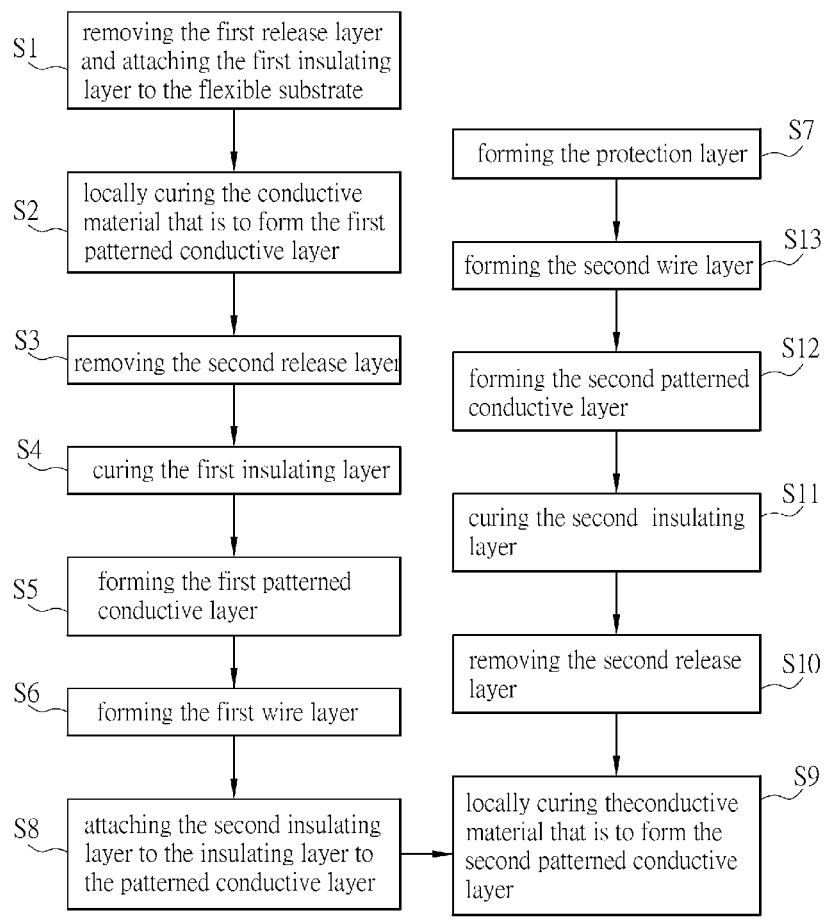
FIG. 15 is a flowchart of the manufacturing method of the flexible touch sensor of FIG. 12 of the disclosure.

Refer to FIG. 15, which is a flowchart of the manufacturing method of the flexible touch sensor of FIG. 12 of the disclosure. The main difference from FIG. 2 is that the manufacturing method of FIG. 12 further includes the steps S8~S13 for forming the second insulating layer 215, the second patterned conductive layer 216 and the second wire layer 217 before the step S7 for forming the protection layer 214 and after the step S6 for forming the first wire layer 213. Since the steps for forming the first insulating layer 211, the first patterned conductive layer 212 and the first wire layer 213 are the same as FIG. 1, the related illustration is omitted here for conciseness.

Physically, the first insulating layer 211, the first patterned conductive layer 212 and the first wire layer 213 are sequentially formed by the steps S1 to S6, and then the steps S8 to S13 are sequentially implemented to form the second insulating layer 215 on the first patterned conductive layer 212 and the first wire layer 213, the second patterned conductive layer 216 on the second insulating layer 215, and the second wire layer 217 on the second insulating layer 215 and electrically connected with the second patterned conductive layer 216. Since the manufacturing methods of the second insulating layer 215, second patterned conductive layer 216 and second wire layer 217 are approximately the same as the manufacturing methods of the first insulating layer 211, first patterned conductive layer 212 and first wire layer 213 and the difference therebetween is just about the pattern and is comprehended by those skilled in the art, the illustration about the steps S8~S13 is comprehended by referring to the steps S1~S6 and is therefore omitted here for conciseness.

After the steps S8~S13 are completed, the protection layer 214 is formed on the second patterned conductive layer 216 and the second wire layer 217 according to the step S7.

In some embodiments, the manufacturing method of the flexible touch sensor is simple and has repeated steps, so the difficulty of the production is reduced. Furthermore, because the formed layer structure (such as the first insulating layer and the first patterned conductive layer) are all covered when the subsequent structure (such as the second insulating layer and the second patterned conductive layer) is formed, the formed layer structure will not be affected thereby, and therefore the process yield and the product stability is further enhanced.

Figure 16:
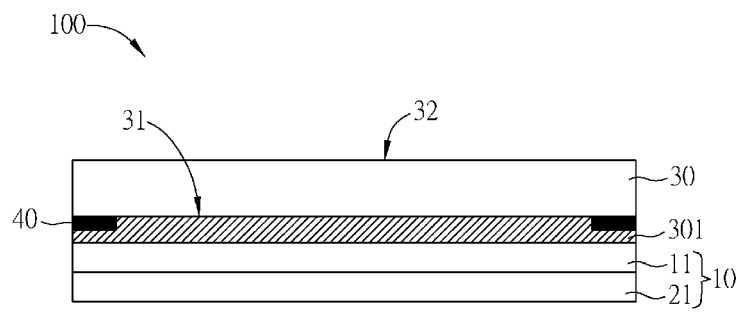
FIG. 16 is a schematic diagram of the touch panel stack structure of some embodiments of the disclosure.

A touch panel is further provided, including any of the above-mentioned flexible touch sensing structures and a cover plate, as shown in FIG. 16, which is a schematic diagram of the touch panel stack structure of FIG. 16 of the disclosure.

The touch panel 100 includes a flexible touch sensor 10 and a cover plate 30. The flexible touch sensor 10 is disposed under the cover plate 30 and attached to the cover plate 30 by an adhesive layer 301. In some embodiments, the flexible touch sensor 10 is one of the flexible touch sensors 10A, 10B, 10C 10D, so the related illustration is omitted here for conciseness.

Figure 17:
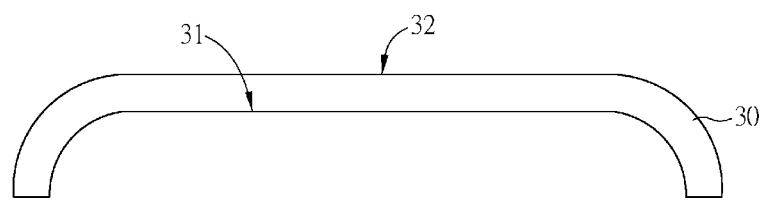
FIG. 17 is a schematic sectional diagram of the cover plate of the touch panel of some embodiments of the disclosure.

The cover plate 30 is formed by a hard substrate, and the material thereof is one of reinforced glass, sapphire glass, PI, PP, PS, ABS, PET, PVC, PC, PE, PMMA and PTFE. The material is transparent, opaque or translucent according to the requirement. The cover plate 30 may be formed by a flexible substrate. The lower surface 31 of the cover plate 30 is attached to the flexible sensor 10, and the upper surface thereof can serve as the contact surface for a touch object. In some embodiments, the lower surface 31 of the cover plate 30 is a level structure; however, the lower surface 31 also may be a curved structure in other embodiments, as shown in FIG. 17, which is a schematic sectional diagram of the cover plate of the touch panel of an embodiment of the disclosure. In some embodiments, since the flexible touch sensor 10 has a certain degree of flexibility, it is attached to the cover plate with a curved structure so as to meet the different product requirement. Besides, in some embodiments of FIG. 16, the cover plate 30 is further configured with, a blocking layer 40, which is disposed between the adhesive layer 301 and the cover plate 30 and corresponding to the first wire layer 213 and second wire layer 217 of the flexible touch sensor 10. Physically, the blocking layer 40 is formed on the lower surface 31 of the cover plate 30, and the normal projection of the blocking layer 40 on the cover plate 30 can at least cover the normal projection of the first wire layer 213 and second wire layer 217 on the cover plate 30. The blocking layer 40 is formed by opaque ink or photoresistive material and can block the first wire layer 213 and the second wire layer 217, so that users cannot view the first wire layer 213 and the second wire layer 217 from the product's appearance and the appearance effect of the product is thus enhanced. Moreover, the blocking layer 40 also can define the regions of the display and touch control of the product so as to provide a friendly operation interface for users. To be noted, the blocking layer 40 may be formed on the upper surface of the cover plate 30 in other embodiments.

The adhesive layer 301 is disposed between the cover plate 30 and the flexible touch sensor 10 to attach them to each other. The adhesive layer 301 is formed by an optical adhesive, which is a liquid adhesive or solid tape, but this disclosure is not limited thereto.

The flexible touch sensor 10 is disposed under the adhesive layer 301. In some embodiments, the flexible substrate 11 of the flexible touch sensor 10 contacts the adhesive layer 301, and that is, the flexible substrate 11 is disposed between the adhesive layer 301 and the sensing electrode structure 21. In some embodiments, the flexible substrate 11 is disposed between the sensing electrode structure 21 and the cover plate 30, so that the sensing electrode structure 21 is provided with the buffer and anti-scatter effects and the product is thus enhanced in stability. To be noted, in other embodiments, the sensing electrode structure 21 is disposed between the adhesive layer 301 and the flexible substrate 11, so that the sensing electrode structure 21 is closer to the user's operation surface and can acquire the touch signal from the user more rapidly and accurately thereby.

The manufacturing method of the touch panel of FIG. 16 of the disclosure is illustrated as below.

Refer to FIGS. 18A to 18G, which are schematic diagrams showing the structures in the manufacturing steps of the touch panel of the disclosure.

Figure 18A:
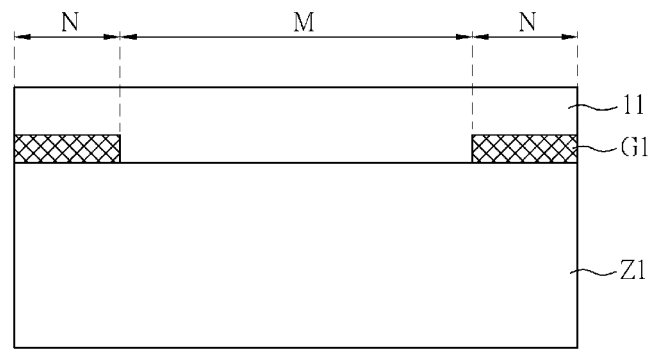
FIGS. 18A to 18G are schematic diagrams showing the structures in the manufacturing steps of the touch panel of the disclosure.

As shown in FIG. 18A, a first carrying plate Z1 is provided, and the flexible substrate 11 is formed on the first carrying plate Z1. The first carrying plate Z1 can provide the mechanical support for the structure formed in the subsequent steps. The first carrying plate Z1 is a transparent or opaque substrate, and here for example, it is a glass substrate.

In some embodiments, the flexible substrate 11 is attached to the first carrying plate Z1 by the first adhesive layer G1. The first adhesive layer G1 is a kind of adhesive containing organo-philic functional group and inorgano-philic functional group. Physically, when the first carrying plate Z1 is formed by inorganic material such as glass and the flexible substrate 11 is formed by organic material such as PI, the different functional groups contained by the first adhesive layer G1 can adapt to the adhesive properties of the two different materials. That is, the first adhesive layer G1 can more securely fix the flexible substrate 11 to the first carrying plate Z1. Moreover, in consideration of that the flexible substrate 11 needs to be more easily removed from the first carrying plate Z1, the first adhesive layer G1 is disposed around the first carrying plate Z1, and for example, in a peripheral region N of the first carrying plate Z1. Accordingly, the connection between the flexible substrate 11 and the first carrying plate Z1 in the peripheral region N is stronger while the connection between the flexible substrate 11 and the first carrying plate Z1 without the peripheral region N (such as the inner region M) is relatively weaker, which can ensure the flexible substrate 11 is securely attached to the first carrying plate Z1 in the subsequent process and also is easily removed from the first carrying plate Z1 when the removal is needed. The removal method will be illustrated below. It is comprehended that, in other embodiments, the first adhesive layer G1 may cover the whole first carrying plate Z1 and the flexible substrate 11 is formed on the first adhesive layer G1. Physically, in this case, the first adhesive layer G1 is formed by the material whose adhesive property is adjustable. That is, the first carrying plate Z1 has stronger stickiness during the manufacturing process, and is reduced in stickiness by being soaked in a particular solution or by a temperature treatment so that it is easily removed from the flexible, substrate 11.

Figure 18B:
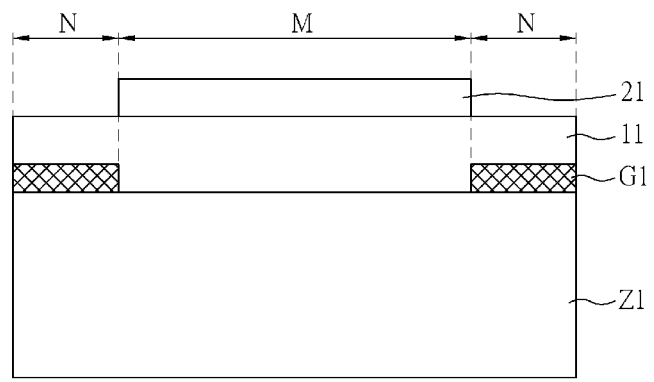

Then, as shown in FIG. 18B, the sensing electrode structure 21 is formed on the flexible substrate 11 and in the inner region M of the first adhesive layer G1. The method for forming the sensing electrode structure 21 is comprehended by referring to some embodiments of FIG. 3 or 15, and the related illustration is omitted here for conciseness.

Figure 18C:
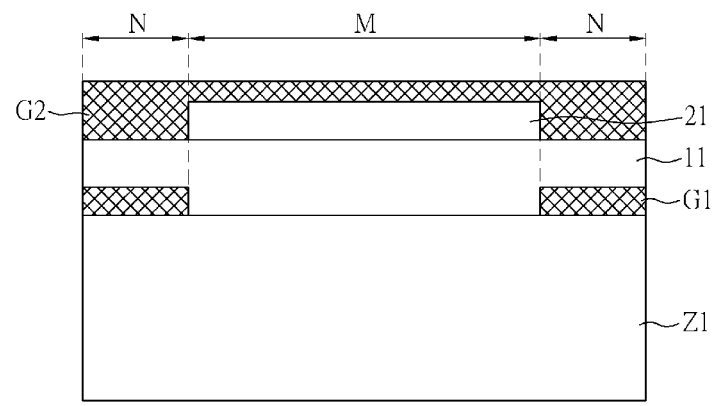

As shown in FIG. 18C, the second carrying plate Z2 is formed on the sensing electrode structure 21 and can partially or totally cover the sensing electrode structure 21. The second carrying plate Z2 is attached to the sensing electrode structure 21 by the second adhesive layer G2. The material of the second carrying plate Z2 includes polymer such as PET or other proper materials, such as glass, COP, Arton, PP, which can support a thin film element to transfer the thin film element to the cover plate. The second adhesive layer G2 is a removable adhesive, which can include water-insoluble adhesive or other proper materials that can temporarily attach the two layers together and also is solved or removed subsequently.

Figure 18D:
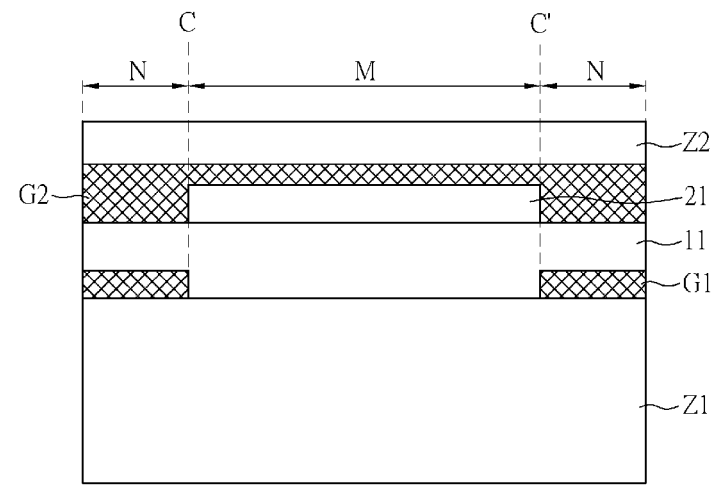
Figure 18E:
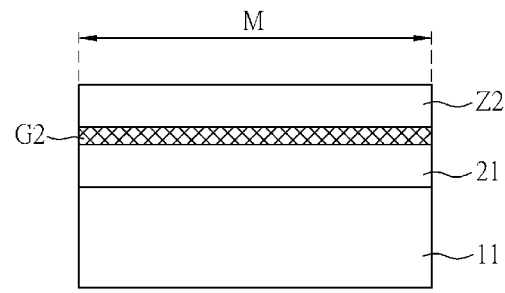

Then, as shown in FIGS. 18D and 18E, the first carrying plate Z1 is removed from the flexible substrate 11. As shown in FIG. 18D, firstly, the first adhesive layer G1 with the structure thereover is cut off along the inner side of the first adhesive layer G1, i.e. along the cutting line C-C' shown in FIG. 18D. Then, the first carrying plate Z1 is removed from the flexible substrate 11. In this case, because the first adhesive layer G1 providing the main adhesive effect is first cut off and then the first carrying plate Z1 is removed, the stress generated during the process of removing the first carrying plate Z1 will less affect the flexible substrate 11 and the structure thereon. Besides, the cutting parameter is controlled during the process of cutting off the first adhesive layer G1, so that the first carrying plate Z1 won't be cut or broken. Therefore, the first carrying plate Z1 is used repeatedly and the cost is thus lowered down. In another embodiment, the first adhesive layer G1 with the portion of the first carrying plate Z1 under the first adhesive layer G1 is firstly cut off along the inner side of the first adhesive layer G1, and then the first carrying plate Z1 that has been cut once is removed. In another embodiment, the first adhesive layer G1 with the structure thereover is cut off along the inner side of the first adhesive layer G1 between the step of forming the sensing electrode structure 21 and the step of forming the second carrying plate Z2, and meanwhile the first carrying plate Z1 remains. Then, the first carrying plate Z1 will be removed after the second carrying plate Z2 is formed.

To be noted, some manner is used during the process of removing the first carrying plate Z1 for helping the release. For example, the first carrying plate Z1 is removed from the flexible substrate 11 by being soaked in a solution, a thermal treatment, a cold treatment, being forced to peel off or their any combination. The above solution is water, alcohol, PGMEA solution or NMP solution. When the thermal treatment or cold treatment is used, the first carrying plate Z1 is heated or cooled, and therefore the stress is generated due to the difference of the thermal expansion coefficient between the flexible substrate 11 and the first carrying plate Z1, facilitating the release.

Figure 18F:
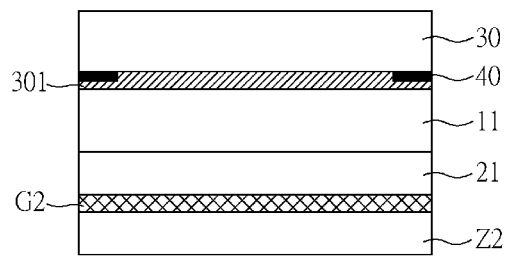

Then, as shown in FIG. 18F, the cover plate 30 is attached to the flexible substrate 11. The cover plate 30 is attached to the flexible structure 11 by the adhesive layer 301 through the lamination manner or other manners. The flexible substrate 11 is disposed between the cover plate 30 and the flexible substrate 11. That is, the sequence of the stack is from top to bottom, the cover plate 30, the adhesive layer 301, the flexible substrate 11, the sensing electrode structure 21, the second adhesive layer G2 and the second carrying plate Z2.

Furthermore, before the cover plate 30 is attached, the blocking layer 40 is formed on the cover plate 30. The blocking, layer 40 is disposed on at least one side of the cover plate 30 to block the first wire layer and the second wire layer (not shown in FIG. 18F), so that the first wire layer and the second wire layer are not easily seen by users from the side of the upper surface of the cover plate 30. In some embodiments, the blocking layer 40 is disposed on the lower surface of the cover plate 30, i.e. on the side of the cover plate 30 facing the flexible substrate 11. In another embodiment, the blocking layer 40 is disposed on the upper surface of the cover plate 30, i.e. on the side of the cover plate 30 away from the flexible substrate 11. In another embodiment, the blocking layer 40 may be a deco-film, wherein the deco-film physically includes a transparent film and the blocking layer is disposed in the peripheral region of the transparent film. The deco-film is directly disposed on the upper surface of the cover plate or can replace the cover plate 30 and the blocking layer 40.

Figure 18G:
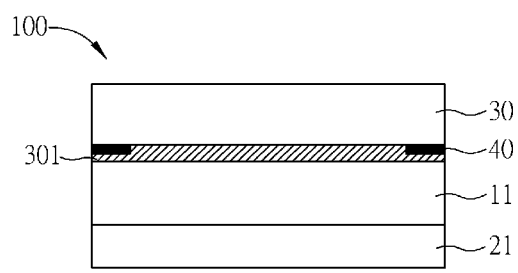

As shown in FIG. 18G, the second carrying plate Z2 and the second adhesive layer G2 are removed from the sensing electrode structure 21. Physically, the second adhesive layer G2 is preprocessed, for example, by the illumination, thermal treatment, cold treatment or their any combination. For example, the second adhesive layer G2 is reduced in stickiness by UV illumination, heating or cooling according to the material type, and then the second adhesive layer G2 and the second carrying plate Z2 is removed from the sensing electrode structure 21. The removal manner of the second adhesive layer G2 is determined according to the material of the second adhesive layer G2.

Throughout the above-mentioned steps, the touch panel 100 shown in FIG. 18G is formed. The stack of the touch panel 100 includes, from top to bottom, the cover plate 30, the adhesive layer 301, the flexible substrate 11 and the sensing electrode structure 21. That is, the flexible substrate 11 is disposed on the cover plate 30 and the sensing electrode structure 21 is disposed on the flexible substrate 11. The adhesive layer 301 is disposed between the cover plate 30 and the flexible substrate 11. Further, the touch panel 100 includes the blocking layer 40 disposed on at least one side of the cover plate 30. The structure, material and manufacturing method of the above-mentioned elements have been illustrated hereinbefore, so the related illustration is omitted here for conciseness. The touch panel 100 is applied to the computer system, cell phone, digital media player, or other touch display devices.

Summarily, in this disclosure, the sensing electrode structure is disposed on a flexible substrate and the composition and material of the sensing electrode structure are improved. Thereby, the touch sensor is provided with a certain degree of flexibility and thus suitable for the product designs of flat and curved attachment surfaces. Besides, the whole structure of the touch sensor is lightened and thinned.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated, that the appended claims will cover all modifications that fall within the true scope of the disclosure.

What is claimed is:

1. A flexible touch sensor, comprising:
   a sensing electrode structure disposed on a flexible substrate and comprising:
      a first insulating layer;
      a first patterned conductive layer disposed on the first insulating layer, wherein:
         the first insulating layer is disposed between the flexible substrate and the first patterned conductive layer, and
         the first insulating layer directly contacts the flexible substrate;
      a first wire layer disposed on the first insulating layer, wherein the first wire layer is electrically connected with the first patterned conductive layer;
      a joint where the first wire layer directly contacts the first patterned conductive layer;
      a second insulating layer disposed on the first patterned conductive layer, wherein the second insulating layer overlies a portion of the first patterned conductive layer but avoids the joint;
      a second patterned conductive layer formed on the second insulating layer;
      a second wire layer electrically connected with the second patterned conductive layer, wherein the second wire layer is disposed on the second insulating layer and on a same surface of the second insulating layer as the second patterned conductive layer; and
      a protection layer disposed over the second patterned conductive layer and in contact with the first insulating layer, wherein:
         the protection layer directly contacts the joint,
         the protection layer directly or indirectly contacts a to surface and a sidewall of the first wire layer, and
         the protection layer directly contacts a to surface and a sidewall of the second insulating layer.

2. The flexible touch sensor as recited in claim 1, wherein the protection layer directly contacts the top surface and the sidewall of the first wire layer.

3. The flexible touch sensor as recited in claim 1, wherein the flexible substrate is between 0.1 μm and 15 μm thick.

4. The flexible touch sensor as recited in claim 1, wherein the first insulating layer has a hot pressing adhesion property.

5. The flexible touch sensor as recited in claim 1, wherein the first patterned conductive layer is formed by a conductive plasma containing conductive polymer material or nano metal material.

6. A touch panel, comprising:
a flexible touch sensor, comprising:
   a sensing electrode structure disposed on a flexible substrate and comprising:
      a first insulating layer;
      a first patterned conductive layer disposed on the first insulating layer, wherein:
         the first insulating layer is disposed between the flexible substrate and the first patterned conductive layer, and
         the first insulating layer directly contacts the flexible substrate;
      a first wire layer disposed on the first insulating layer, wherein the first wire layer is electrically connected with the first patterned conductive layer;
      a joint where the first wire layer directly contacts the first patterned conductive layer;
      a second patterned conductive layer disposed over the first patterned conductive layer;
      a second insulating layer disposed between the first patterned conductive layer and the second patterned conductive layer, wherein the second insulating layer overlies a portion of the first patterned conductive layer but avoids the joint; and
      a protection layer in direct contact with a top surface and a sidewall of the second patterned conductive layer, the first insulating layer, and the joint, wherein the protection layer further directly or indirectly contacts a to surface and a sidewall of the first wire layer; and
   a cover plate, wherein the cover plate and the flexible touch sensor are attached to each other by an adhesive layer.

7. The touch panel as recited in claim 6, wherein:
a blocking layer is formed on the cover plate, and
the blocking layer overlies the first wire layer and second wire layer of the flexible touch sensor.

8. The touch panel as recited in claim 6, wherein the protection layer directly contacts the top surface and the sidewall of the first wire layer.

9. The touch panel as recited in claim 6, wherein
the protection layer is in direct contact with the second insulating layer.

10. The touch panel as recited in claim 9, wherein the protection layer directly contacts a top surface and a sidewall of the second insulating layer.

\* \* \* \* \*